Feb. 26, 1924.
H. KRIEGSHEIM
PROCESS OF REGENERATING SPENT ZEOLITES
Filed July 22, 1920  3 Sheets-Sheet 2
1,485,334
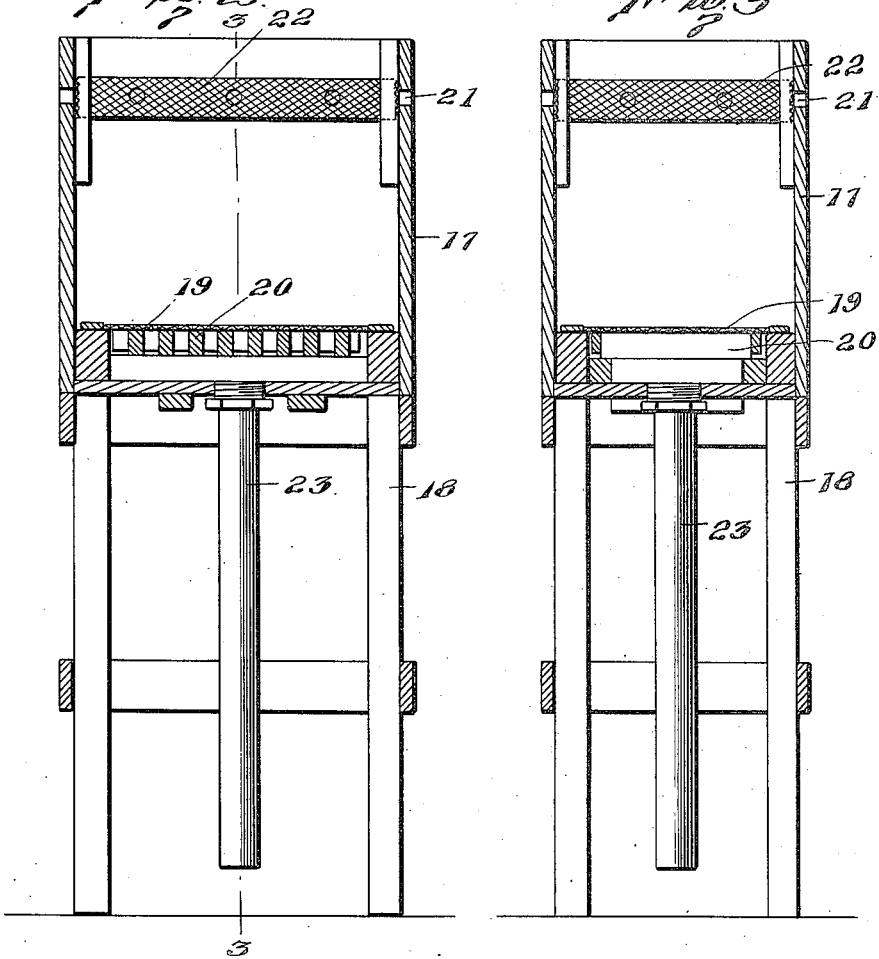
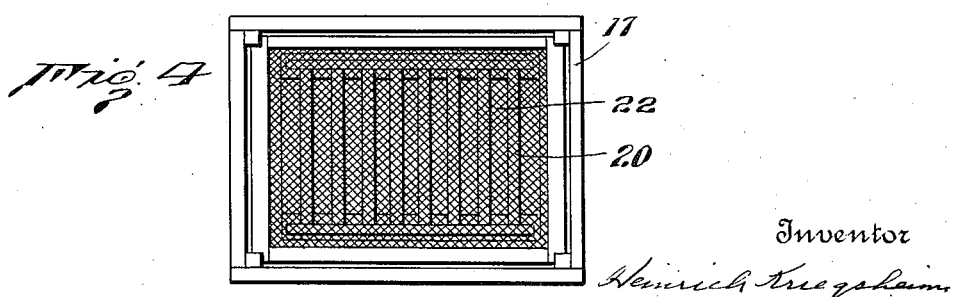
Inventor
Heinrich Kriegsheim
By
K. P. McElroy
his Attorney Feb. 26, 1924.
H. KRIEGSHEIM
1,485,334
PROCESS OF REGENERATING SPENT ZEOLITES
Filed July 22, 1920   3 Sheets-Sheet 3
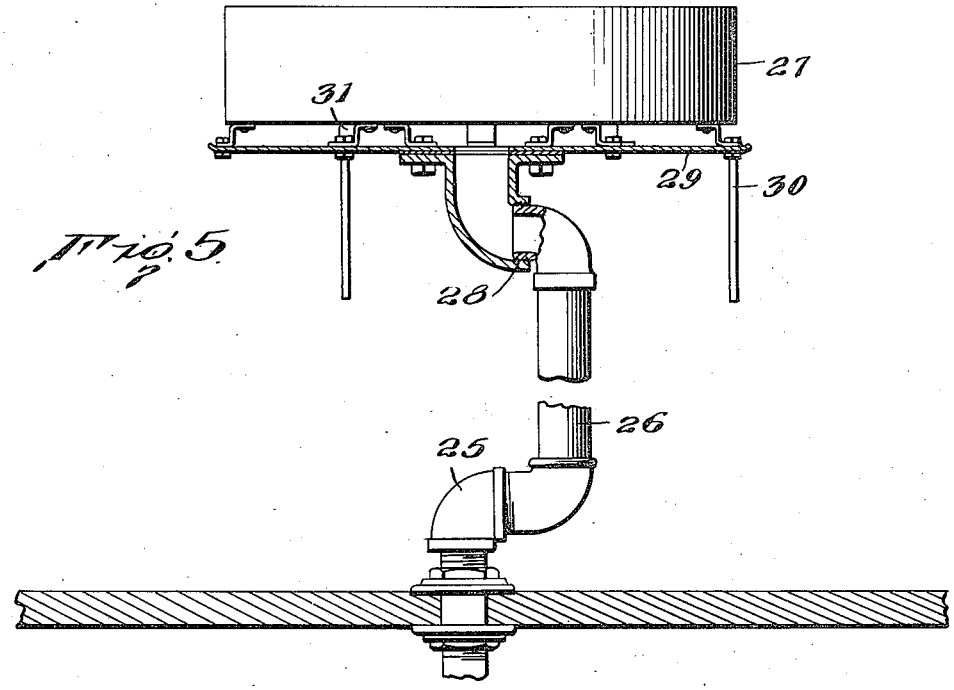
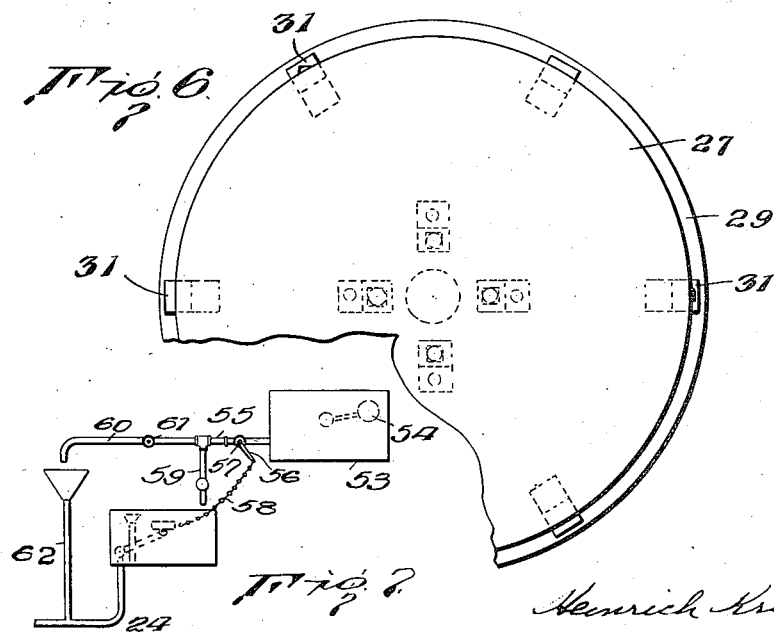
Inventor
Henrich Kriegsheim
K. P. McElroy
His Attorney
By Patented Feb. 26, 1924.

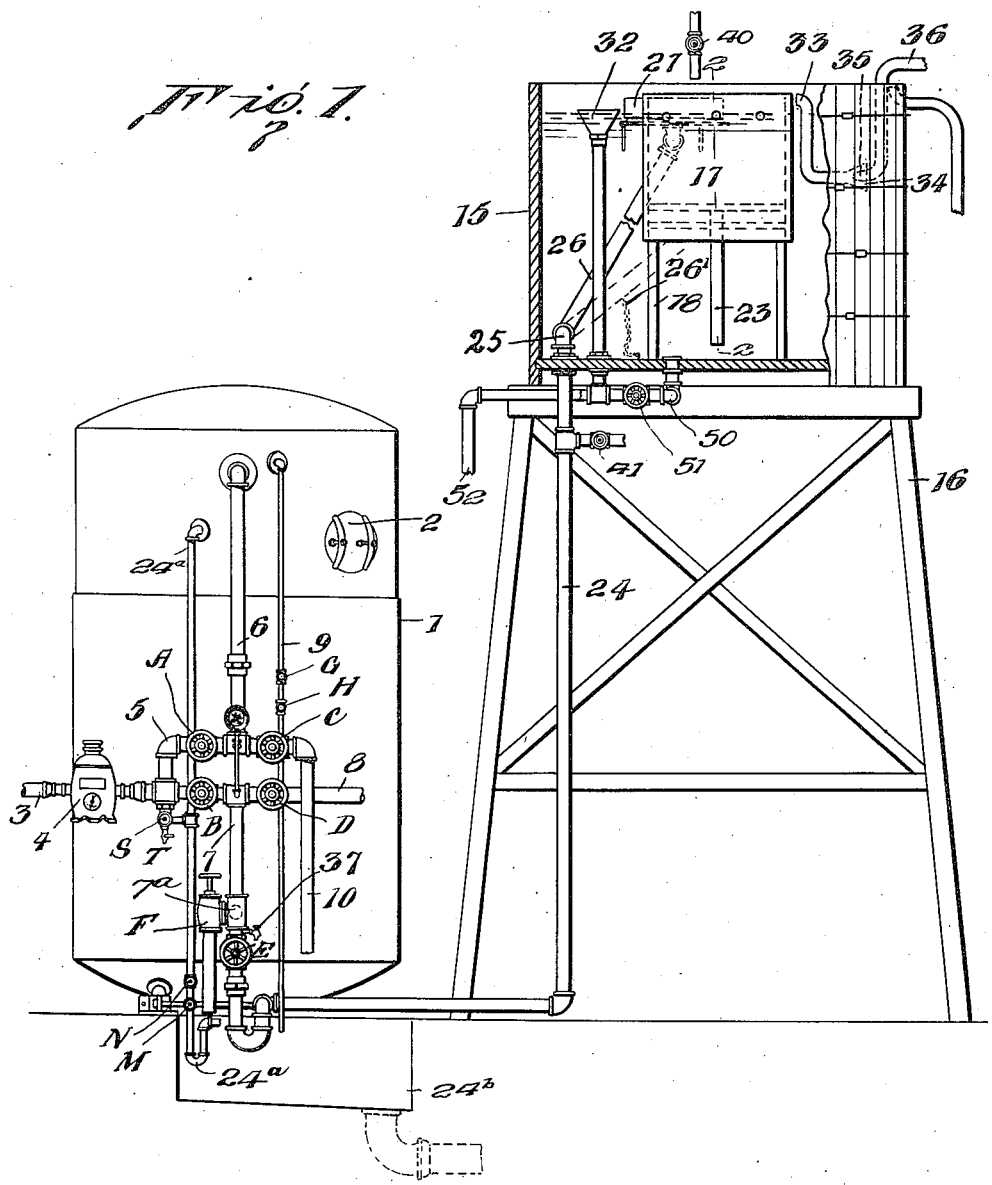

1,485,334

UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

PROCESS OF REGENERATING SPENT ZEOLITES.

Application filed July 22, 1920. Serial No. 398,087.

*To all whom it may concern:*

Be it known that I, HEINRICH KRIEGSHEIM, a citizen of Germany, residing at New York, in the county of New York and State of New York, have invented certain new and useful Improvements in a Process of Regenerating Spent Zeolites, of which the following is a specification.

This invention relates to water softening; and it comprises a method of regenerating zeolites used for water softening with the aid of salt solution wherein certain economies in the use of salt and other advantages are secured, the exhausted zeolites being methodically treated with salt solutions of different strengths delivered from a brine tank wherein they are stored in the order of such strengths; certain liquids reclaimed from the zeolites during the regenerating process and during rinsing the zeolites after regenerating, being sent to such tank for storage therein and reuse in a subsequent operation; and it further comprises as a new organization of apparatus-elements the combination of a water softening device containing a bed of zeolites, connections for delivering hard water to be softened thereto for passage therethrough and for removing softened water therefrom, means for backwashing and stirring the bed, means for introducing salt solution, means for removing contaminated salt solution and means for recovering uncontaminated salt solution, the last stated means including a brine tank, pipe connections to the bottom of the zeolite container and a float controlled delivery device adapted to deliver and remove liquid thereinto at successively higher levels and therefrom at successively lower levels, said brine tank also being in communication with a brine making device adapted to receive liquid from a high point in the tank and to deliver more concentrated brine thereinto at a lower point; all as more fully hereinafter set forth and as claimed.

The softening of hard water by the use of various zeolitic silicates or exchange silicates is now a well established process. In the softening operation water containing hardness giving constituents (calcium and magnesium compounds) is passed through a granular bed of zeolites. During its passage calcium and magnesium compounds are abstracted from the water by the zeolites. After a time it becomes necessary to revive or regenerate these zeolites and this is done by flowing through the bed a solution of common salt. This salt converts the calcium and magnesium compounds into soluble chlorids while the zeolites take up a certain amount of sodium in exchange therefor, and are ready for reuse after removing the salt and rinsing with water. In this water softening process, as will be noted, the only materials consumed are the common salt and water used in regeneration and while these are cheap and the amounts used are not very considerable, it is nevertheless desirable to have economical operation and to provide simple apparatus. The main object of the present invention is to accomplish these purposes.

Presuming the water in softening is passed through the bed of zeolites downward, it is found that the bulk of the matters abstracted from the water (calcium and magnesium compounds) occurs in the top layers of the zeolites, the lower layers being much less contaminated thereby, or not contaminated at all, as the case may be. After a period of use, if the flow of water is interrupted and a salt solution is introduced at the base this solution as it rises will carry upward or float ahead of it such water as remains in the bed; the amount of the displaced water being of course greater if the bed has not been drained prior to introducing the solution. In its upward advance the solution at first passes uncontaminated or but little contaminated zeolites, itself suffering no change or but little change in purity, and finally reaches the level of the more contaminated layers where active regeneration takes place, the salt solution taking up calcium and magnesium as chlorids. The first saline solution emerging above the bed, following the displaced water, is rich in calcium and magnesium chlorids (either or both, according to the water softened) and may contain no sodium chlorid, or substantially none. The following portions of salt solution are less and less altered until finally pure, or substantially pure, sodium chlorid solution makes its appearance above the bed. At this time the bed below is full of pure solution. In so operating, it is obvious that only a part of the total salt solution supplied to the apparatus is really used in regeneration, the rest of it being merely a means for displacing the portion which is so used. The two portions may be called, respectively, the regenerating solution and the displacing solution. In the interest of economy it is worth while saving at least the displacing solution for reuse while the regeneration brine may be run to waste or utilized for any purpose for which it is adapted. There is of course no sharp line of demarkation between the regenerating solution and the displacing solution which merge into each other more or less; and in each case the point at which the solution is considered sufficiently uncontaminated to be worth recovering depends on circumstances. It is common practice to interrupt the upward flow of salt solution at the time deemed proper, drawing off above the contaminated liquid which has passed through and drawing off below and recovering the displacing brine for reuse. After removing the displacing brine the zeolites are rinsed with a downward flow of water in order to remove all residual salt solution. In so operating the effluents at the bottom are, first the replacing liquid and then the water used for rinsing, which, by reason of the salt solution it takes up, appears as a saline solution progressively becoming weaker and weaker. Finally, fresh and soft water appears below. It is worth while recovering these rinsings, since they contain salt and softened water, and using them for making brine. In the art, these removed liquids have been separately collected and stored, the strong brine being stored in one receptacle for direct reuse in a following regeneration, while the weaker following brines have been stored elsewhere to be strengthened with salt for another operation. This involves however the use of a plurality of storage receptacles and is otherwise undesirable.

In the present invention I modify this practice by taking methodical advantage of the difference in specific gravity of the replacing liquid and of the salt solution obtained during rinsing to store them in a common receptacle. In so doing, I flow the brine upwardly in regeneration through the zeolite bed, with removal at a point thereabove, as is the best practice, until the brine appearing at the top level of the bed is considered pure, or sufficiently pure, to warrant cessation of regeneration and remove in any suitable way that which has passed through the bed. The brine remaining in the bed is now drawn off and collected for reuse. The precise way in which this is done depends upon the arrangement of the apparatus. If the storage tank is at a lower level, the residual brine is simply allowed to flow into it. Or with a pump in the brine line, the brine may be removed to a tank at a higher level. In either case after the brine is removed from the bed rinsing water may be allowed to flow therethrough and be removed at the bottom and stored in the same tank floating on the denser solution already contained therein. If, however, the storage tank is on the same floor level as the softener or is located at a point thereabove, it is commonly easier and more economical to displace the salt solution downward by a flow of water under pressure. This obviates any necessity for a pump in the brine line. In the best embodiment of the present invention, the storage tank or brine tank is provided with a float controlled delivery device so arranged as to deposit successively following liquids at levels controlled by the float. Presuming that the brine is forced out by water admitted above the bed, the replacing liquid, i. e. the brine in the zeolite bed, is forced downwardly and through the conduit into the empty brine tank. As the float rises liquid is delivered at progressively higher levels. The water which forces the replacing liquid out of the softener, serves also as rinsing water since it automatically rinses out residual adhering and absorbed salt solution, thereby itself becoming charged with salt with formation of solutions of progressively decreasing concentration. As these rinsing liquids follow the replacing brine they are progressively delivered at higher and higher levels in the brine tank. As so far stated, I have delivered and collected in a single tank a body of liquid having strong brine at its base and floating on it progressively weaker layers of salt solution, the topmost portion being, usually, fresh water. Assuming that the brine tank is of a size sufficient to contain the total amount of salt solution needed in regeneration, it is obvious that my tank while containing the desired volume of liquid does not now have the necessary quantity of salt in solution. Therefore I arrange in, or in connection with, the brine tank, a brine making device having a water inflow at a level corresponding to the top level of the liquid in the tank and at its bottom a pipe connection leading to a lower level of the tank. Within this device I put the appropriate amount of salt.

The salt submerged in the liquid within the box will dissolve and as soon as the density of the brine in the brine making device exceeds the density of the brine outside, a slow flow of liquid into the top of the arrangement, and a slow flow out at its base will be created. The net result is that the weak liquid at the top of the tank dissolves the salt in the salt box and that the freshly made brine will be of a concentration approximately equal to that in the salt tank at the level of the lower end of the pipe leading toward the bottom of the salt box. According to the location of the lower end of the pipe, the freshly made brine may be stored below the replacing brine, or within the same, or above it. The whole amount of brine above the lower edge of the pipe will be lifted up and the weakest brine in the top portion of the salt tank will enter the salt box, and dissolve additional salt. As soon as all the salt is dissolved, the flow caused by the solution of the salt stops automatically and the tank will then contain the proper amount of dissolved salt for the next regeneration, stored therein in the order of different concentration. It is advantageous to deliver the freshly made brine at the lowest point in so far as the larger amount of replacing liquid will thus be overlying and can then be used as regenerating liquid, the freshly made brine serving for replacement. If there is a slight contamination of the original replacing liquid by calcium and magnesium not removed and carried away by the regenerating liquid proper, there will be nevertheless no accumulation of such impurities in the new replacing liquid. If the pipe line connected to the bottom of the salt box is not carried to the bottom of the salt tank, then the freshly made brine will mingle with the replacing liquid or, possibly (according to its level), with parts of the weak brine obtained during the rinsing process. Therefore, in this case, there will be added to the replacing liquid a certain amount of freshly made brine so that any accumulation of contaminating substances (calcium and magnesium) will be counteracted.

In order to take care of any excess of rinsing water that may be used I customarily provide the storage tank with an overflow connection. I usually make the arrangement such that when the liquid in the tank reaches the overflow level it will be free, or practically free of salt. In operating the storage tank as described, the liquid in the uppermost level will of course be weak in salt; and it may even be free from salt. While it is desirable to use in the first contact with the zeolites, a salt solution materially weaker than that subsequently used, it is not ordinarily worth while to use these very weak overlying layers for this purpose. Therefore I ordinarily provide the tank with means for homogenizing or mixing the uppermost layers.

In regeneration the dissolved salt (sodium chlorid) plays the active part; but the character of the salt solution as regards concentration has a certain influence on the action. More thorough and more uniform results in the regeneration are obtained when the initial action on the zeolite bed is with a less concentrated solution than that subsequently used, provided that equal quantities of dissolved salt are used, the variation only being in the relative proportion of the solvent water. In operating as just described the admixed and averaged upper portions form a weak solution such as is advantageously used in the first stages of regeneration. There is, however, the disadvantage that the storing of dilute brine requires a greater cubic capacity of tank than where only stronger brines are used. The same result of using an initially weaker solution can be accomplished by feeding a little water to the brine in the top of the tank during delivery of the topmost portions to the bed of zeolites for regeneration of the same. Or a little water may be supplied to the brine line through a T-connection during the initial flow toward the zeolite. In adding additional water in this way it is better to use soft water than hard.

In the accompanying drawings I have shown two forms of apparatus suitable for the performance of my process and within the purview of my invention. In the drawings;

Figure 1 is a view partly in section and partly in elevation of the water softener;

Figure 2 is a vertical section through the salt box along line 2—2 of Figure 1;

Figure 3 is a vertical section along line 3—3 of Figure 2;

Figure 4 is a top plan view of Figure 2;

Figure 5 is a detailed view of the float and swinging pipe connection partly in section and partly in elevation;

Figure 6 is a top plan view of Figure 5; and

Figure 7 is a detail of a modification.

Referring to the drawings, 1 indicates a softener tank containing a suitably arranged bed of suitable zeolites. It is shown provided with a manhole 2. Water to be softened is admitted through hard water inlet 3, past the meter 4, through valved connection 5 to the upright pipe 6 whence it flows inside the softener downward through the bed of exchange material therein to outlet by T-piece 7ª, pipe 7 and to soft water outlet 8, valve D being open. Valve A on the hard water line being open, valve D on the soft water outlet is set so that the soft water flows at a predetermined rate, calculated in accordance with the hardness of the water to be softened, the capacity of the softener and the amount of exchange silicates in the softener. The softener is provided with the air relief pipe 9 having the valves G and H. During the softening operation these valves G and H should be left slightly open to allow any accumulating air to escape and thus to keep the softener full of water.

When the number of gallons of water corresponding to the softening capacity of the softener have passed through the softener all valves are closed. If backwashing is considered necessary the valves G and H on the air relief pipe are again opened and valve C on discharge pipe 10 is opened. Valve B on the water inlet is also opened. Wash water from the line 3 is then admitted and goes past the valve B down into the pipe 7 to 7ª, thence upwardly through the bed of exchange silicates and downwardly on the outside by pipe 6, thence past valve C to the discharge line 10. It will be noted that this washing is in the reverse direction of the flow of hard water which was softened. Valve C on the discharge line 10 and S and B on the water line 3 are then closed. The flow of a small stream of water, valve S being open, into the upper part of pipe 24ª, (valve M being closed) may be permitted, during backwashing if it be desired to prevent granular softening material being washed into this pipe line. It is best to wait a few minutes after this backwashing to allow the bed of material to settle. The settling may be accelerated by opening drain valve F to cause a downward flow of water in the softener for a few moments. This drains off some or much of the water in the softener casing, and in the usual mode of operation with the structure shown, valve A is again opened and water allowed to enter and fill the softener from line 3, the flow being continued until water overflows in air relief pipe 9. Then valves A, G and H should be closed.

The softener is now ready for regeneration or revivification. For this purpose the brine supplying and brine making apparatus shown at the right of the softener in Fig. 1, is used. Salt tank 15, as shown, is mounted upon suitable supports 16 in an elevated position and contains a salt box or brine making device 17, resting on the supports 18. The salt box, as shown in Figs. 2 and 3, has a bottom screen 19 resting on supports 20 and is provided with holes 21 near the top, these holes being protected by screen 22 which prevents any dirt from the salt floating off into the brine tank. The bottom of the salt box is provided with depending pipe 23 extending towards or to the bottom of the brine tank. The salt box being supplied with salt, a circulation ensues with production of brine, water from the tank flowing in through the holes 21, dissolving the salt and solution passing downward by pipe 23 to the level at which the pipe ends.

In regeneration, brine is taken from the brine tank by pipe 24 which connects the softener with the bottom of the salt tank 15 through T connection 7ª, valve E being opened for this purpose and the other valves closed with the exception of N and M on line 24ª. Within the brine tank is swing pipe 26 connected to 24 by pivotal coupling 25 (see Fig. 5). Float 27 carrying inlet 28 is pivotally connected to the swing pipe. The float also carries plate 29 provided with legs 30 to maintain it in horizontal position when it approaches the bottom of the tank 15. The plate is held on the float by lugs 31. As shown in Fig. 1, the float and the end of the swing pipe may move into any position between the top portion of liquid in the tank and the bottom portion. For some purposes (as later described) it is desirable to arrest the movement of the float before it reaches the top portion of liquid and to this end it may be provided with chain 26' or other means of limiting the upward movement. At whatever position the top of the swing pipe and float may be, liquid enters through 28 and passes by means of 24 and 7ª to the bottom of the softener. Progressively stronger salt solutions of gradated strength are thus passed through the zeolites. Or conversely, liquid may be taken from the bottom of the softener through 7ª and 24 and delivered into the tank at whatever position the float may occupy.

As previously stated, it is desirable in regeneration to effect the initial contact of salt solution and zeolites with a weaker salt solution than is subsequently employed. Presuming that the salt tank contains brine solutions of different concentration, the weaker being on the top, it is obvious that with the tank full 26 will draw from the weaker portions before drawing from the stronger. The same result however of initially contacting with the weaker solution can be attained where the brine in the tank is of uniform density, or is stronger than is desired for the initial contact, by the simple expedient of delivering a little water (which is best soft water) on the uppermost layer of brine in the tank, so that it will flow away simultaneously with the brine through pipe 26. As shown, this may be done by valved water connection 40. By opening the valve any desired amount of water can be allowed to flow on the top of the salt solution for any desired length of time. Or water may be directly introduced into line 24 by means of valved water inlet 41.

Presuming tank 15 is full of brine solution of downwardly increasing density and regeneration is to be begun, valve E and valves N and M on line 24ª are opened. Salt solution now flows through 26, 24 and 7ª into the bottom of the softener and thence upwardly displacing the water present before it. This water flows through 24ª into the sump 24ᵇ. As upwardly flowing salt solution reaches the layers of zeolites containing calcium and magnesium, it regenerates them, with the formation of calcium and magnesium chlorid in solution (either or both). The first portions of saline solution reaching 24ª may be substantially free of sodium. As the flow from tank 15 through 26 and 24 continues the zeolites are treated with salt solution of constantly increasing concentration. As the flow continues the liquid passing away through 24ª contains less and less calcium chlorid and magnesium chlorid. It may be tested from time to time. Dimensions and conditions are usually so arranged that regeneration is accomplished by the time that float 27 has reached the bottom of the tank 15 and the liquid therein has been delivered into the softener. At this time the zeolite bed is full of replacing solution which it is desirable to recover. Valve E may now be closed, valves N and M remaining open and valve A opened. This allows a flow of water into the top of the softener which flushes away through 24ª any exhausted salt lying above the zeolite bed. Ordinarily the water is allowed to flow in this manner until the taste of salt nearly disappears in the water emerging through 24ª. Valves N and M are now closed and valve E opened. Water flowing in from 3 and 5 past valve A goes to the top of the softener through 6 and displaces downwardly the salt solution in the softener, this salt solution passing out through T 7ª and line 24 back into the salt tank. Float 27 being now at the bottom of the empty tank this strong salt solution is delivered at that point. As the flow of water through 6 continues the zeolite bed is rinsed of adhering salt solution with formation of saline solutions of steadily decreasing concentration. These are successively deposited in tank 15 by the swing pipe. Any excess of water passed through the bed over and above the capacity of tank 15 may flow to waste through overflow 32. It is usual to continue the flow of water through the zeolite bed until a sample drawn from sample cock 37 in the salt line is free from taste of salt or is free from hardness as is indicated by the usual soap test.

As so far described, the salt tank has been filled with a series of bodies of liquid, the lowermost being strong brine and overlying being weaker in salt. The top portion may be very weak in salt or may even be fresh water. Prior to regeneration it is necessary to add more salt. This is done by depositing the required amount of salt in the salt box 17. It is then in general desirable to produce commixture of the uppermost portion of liquid in the tank; this being for the reason that the topmost liquid is usually too weak. This commixture may be performed in various ways shown in Fig. 1. Ordinarily it is desirable to produce commixture of the top third of the total contents of the tank. The admixture may be accomplished by means of air or steam introduced through a pipe which terminates just below the portions to be mixed. The air or the steam or the hot water produced by the steam introduced through such a pipe, will stir up the portions above and mix them, or an injector apparatus which comprises pipe 33, having an outlet just at or near the level of the liquid in the tank and having the inlet 34 about one-third way down the tank, may be used for the same purpose. Nozzle 35 in communication with the pipe 36 enters this opening 34. Air or steam may be passed through the pipe 36 from a source (not shown) to pass the brine from point 34 to the top of the liquid. Another way of mixing the upper portions is by simply arresting the upward movement of the swinging pipe in filling the brine tank after it has risen to a certain level; the level above which a mixing of overlying portions is desired. This may be accomplished as shown in Fig. 1 by the chain 26', one end of the chain being fastened to the bottom of the tank and the other to the swing pipe. This limits the upward movement of the swing pipe to the position shown in dotted lines. If the height of the float is two-thirds of the depth of the tank, the liquids introduced into the tank will form successive bodies until the tank is two-thirds full. At this point further upward movement of the float is arrested by the chain. From this time on lighter liquids are introduced into and flow upward through heavier liquids with the result of producing admixture. In using the chain arrangement just described, there is the disadvantage that any overflow through funnel 32 results in a loss of salt solution. Any usual type of alarm means may be provided in this case to call attention to the fact when the tank is completely filled. Instead of using an alarm, of course, another float (not shown) can be so arranged as to automatically stop further flow of liquid to the softener by well understood mechanical means, closing valve A or a special valve in pipe 24. By any of the devices described or other similarly acting circulating devices, I am enabled to secure a localized circulation of the salt solution in the upper part of the tank and thus deliver moderately strong active brine at the beginning of the regeneration. Draining of the salt tank for cleaning out purposes is provided for by drain connection 50, valve 51 and outlet 52. Hard water flowing to the apparatus may be tested from time to time at test cock T communicating with the water line 5 past cross-valve S.

While I have described and shown more particularly my invention as applied to a zeolite softener using a special method of regeneration, it is obvious that by suitable arrangement of draw off pipes and connections such invention may be applied to a variety of other methods of regeneration where stronger and weaker brines are successively used or successively formed; such liquids of differing density being stored together in a common tank. I regard the swinging float-controlled pipe as the simplest and best way of utilizing my invention; and particularly in connection with the advantageous method of regeneration described. It offers a single connection capable of successively delivering heavier and lighter liquids to a tank and of withdrawing them in the reverse order; that is, it performs functions which otherwise would necessitate a number of different connections and a complex arrangement.

In Figure 7 I have shown a modified method of automatically adding diluting water to the initial brine used in regeneration; the water being, alternatively, added to the liquid in the brine tank or to the brine flowing away therefrom. In this showing a water box 53 is supplied with water by means of float valve arrangement 54. Leading from this water box is discharge pipe 55 having a rocker arm 56 controlling valve 57. This rocker arm is connected by chain 58 with the float in the brine tank so that when the latter float falls below a predetermined point, valve 57 is closed. Beyond this latter valve is valved pipe 59 ending above the level of liquid in the brine tank. Pipe 60, valved at 61, leads to a point above a funnel-topped pipe 62 connected to the brine pipe 24.

In using this structure, if it is desired to supply a certain amount of water together with the brine at first taken from the tank by the swing pipe, the valve in 59 is opened, valve 61 being closed. Until the float in the brine tank falls sufficiently far, say a third or two-thirds of the height of the tank, valve 57 remains open and water flows into the brine tank. It is then closed and only brine thereafter flows into the swing pipe. Alternatively, the valve of 59 being closed and 61 open, diluting water during the same period flows directly, by way of 62, into the brine pipe 24. It may be noted in this connection that in supplying diluting water in the latter manner, the specific gravity of the salt solution must be taken into consideration and the funnel topped pipe 62 made high enough to secure feed of water into the brine.

What I claim is:—

1. In the softening of water by zeolitic methods wherein hard water to be softened and a regenerating flow of salt solution are alternately passed through a bed of zeolites, the process which comprises continuing the flow of salt solution as long as emerging solution carries substantial amounts of hardness-giving substances, discontinuing the flow, removing from the zeolitic material the salt solution remaining therein, rinsing salt out of the zeolitic material by water, and delivering the reclaimed salt solution and the weaker solutions formed in rinsing to a storage receptacle in such a way that the various salt solutions shall be stored in superimposed order of their densities therein.

2. In the softening of water by zeolitic methods wherein hard water to be softened and a regenerating flow of salt solution are alternately passed through a bed of zeolites, the process which comprises continuing the flow of salt solution as long as emerging solution carries substantial amounts of hardness-giving substances, discontinuing the flow, removing from the zeolitic material the salt solution remaining therein, rinsing salt out of the zeolitic material with water, and delivering the reclaimed salt solution and the weaker solutions formed in rinsing to a storage receptacle in such a way that the various salt solutions shall be stored in superimposed order of their densities and enriching the stored liquids in salt by dissolving salt with the aid of weaker portions.

3. In the softening of water by zeolitic methods wherein hard water to be softened and a regenerating flow of salt solution are alternately passed through a bed of zeolites, the process which comprises continuing the flow of salt solution as long as emerging solution carries substantial amounts of hardness-giving substances, discontinuing the flow, removing from the zeolitic material the salt solution remaining therein, rinsing salt out of the zeolitic material with water, and delivering the reclaimed salt solution and the weaker solutions formed in rinsing to a storage receptacle in such a way that the various salt solutions shall be stored in superimposed order of their densities therein, dissolving salt to a strong brine with the aid of weak overlying liquid and storing the newly made strong brine beneath the portion of reclaimed strong brine.

4. In the softening of water by zeolitic methods wherein hard water to be softened and a regenerating flow of salt solution are alternately passed through a bed of zeolites, the process which comprises continuing the flow of salt solution as long as emerging solution carries substantial amounts of hardness-giving substances, discontinuing the flow, removing from the zeolitic material the salt solution remaining therein, rinsing salt out of the zeolitic material with water, and delivering the reclaimed salt solution and the weaker solutions formed in rinsing to a storage receptacle in such a way that the various salt solutions shall be stored in superimposed order of their densities therein, enriching the stored liquids in salt by dissolving salt with the aid of weaker portions, withdrawing solutions from the stored body of liquid, withdrawal being at or near the top level of the liquid in the receptacles and transmitting the withdrawn liquid to the zeolitic body for another regeneration, transmission being in the order of withdrawal.

5. The process of regenerating zeolitic materials which have softened hard water, which comprises passing a salt solution of gradually increasing strength through said zeolitic material, reclaiming part of the salt solution so used and storing it in a tank together with other salt solutions in superimposed order of density.

6. The process of reclaiming salt solutions of various strength from a zeolitic material upon which they have been used for regeneration purposes which comprises delivering such reclaimed salt solutions to a receptacle, relatively strong salt solutions being delivered near the bottom thereof and the weaker salt solutions nearer the top.

7. The process of reclaiming salt solutions from a zeolitic material upon which they have been used for regeneration purposes, which comprises delivering such reclaimed salt solutions to a receptacle with the strongest salt solution near the bottom thereof, and weaker salt solutions nearer the top and homogenizing certain of the top portions by causing localized circulation of the uppermost part of the liquids in said receptacle.

8. In regenerating zeolitic material with salt solution the process which comprises passing salt solutions of varying strength and specific gravity through such material successively, withdrawing salt solutions of varying strength and specific gravity from said bed in the order of their specific gravity and storing such withdrawn solutions in a common receptacle with the lighter solutions overlying the heavier.

9. In the regeneration of used zeolitic material with successively used salt solutions of varying strength and specific gravity, the process which comprises storing such solutions in a single tank with lighter bodies of liquid overlying the heavier.

10. In regenerating zeolitic material with salt solutions the process which comprises storing salt solutions of varying strength in a common receptacle in such order that the weaker overlies the stronger and transmitting such solutions successively through said material.

11. In regenerating zeolitic material with salt solutions the process which comprises storing salt solutions of varying strength in such order that the weaker overlies the stronger, transmitting such solutions successively to a bed of the said material, displacing the salt solution therefrom by water and forming a weaker solution with the aid of such water, transmitting the stronger solutions back into a receptacle and transmitting the weaker solutions back to the same receptacle atop the strong solutions.

12. The combination with a softening apparatus having an inlet and outlet for salt solution of a salt solution receptacle having a pipe leading therefrom to said softener and means connected to said pipe for delivering salt solution to the salt solution receptacle from the bottom upwardly on top of the underlying solutions.

13. The combination with a softening apparatus having inlet and outlet for salt solution of a salt solution receptacle having a pipe leading therefrom to said softener and means connected to said pipe for delivering salt solutions from the softener to the salt receptacle from the bottom upwardly on top of underlying solutions and for delivering salt solution from the receptacle to the softener from the top downwardly.

14. In combination with a softener apparatus of means for delivering salt solution thereto and receiving salt solution therefrom, said means comprising a main receptacle for the salt solution, a swinging pipe therein, a float on said pipe, and a connection between said pipe and said softener whereby solution delivered from the salt solution receptacle may be taken from the uppermost portion of salt solution in the tank as the swinging pipe descends, and whereby salt solution may be delivered to said salt solution receptacle first towards the bottom and then gradually towards the top as the swinging pipe ascends.

15. A salt solution receptacle for softeners comprising a main tank and a salt container, means for admitting water to the salt container to dissolve salt therein and means leading from said salt container towards the bottom of said salt solution receptacle to deliver salt solution near the bottom of said salt receptacle and means in the salt solution receptacle for delivering the salt solution therefrom gradually from the top downwardly.

16. A salt solution tank for softeners comprising a main receptacle for salt solutions of different strengths and means for storing the solution therein with the strongest towards the bottom and the weakest towards the top.

17. A salt solution tank for softeners comprising a main receptacle for the salt solution, means for storing salt solutions of different density therein with the densest towards the bottom and the lightest towards the top, and means for delivering the solution therefrom in the inverse order of its storage.

18. A salt solution tank for softeners comprising a main receptacle for the salt solutions of different density, means for storing the solutions therein with the densest towards the bottom and the lightest towards the top, and means located a short distance below its top for locally agitating the uppermost portion of solution in said receptacle.

19. A salt solution receptacle for softeners comprising a main receptacle, means for delivering dense salt solution towards the bottom and lighter salt solution towards the top, means for causing a mixing of the lighter top solution, and means for feeding new strong salt solution towards the dense solution at the bottom.

20. In a salt solution apparatus, a main receptacle for salt solutions of varying density and a sub-receptacle for salt, means for admitting water to the sub-receptacle to dissolve the salt therein and make a dense solution and means for delivering the solution so made to the bottom of the main receptacle, whereby the densest salt solution may be stored in said salt receptacle at the bottom with lighter salt solution overlying it, and means for delivering salt solution of gradually increasing strength from said receptacle.

21. In a salt solution apparatus, a main receptacle for salt solutions of different density and a sub-receptacle for salt, means for admitting water to the sub-receptacle to dissolve the salt therein and make a dense solution and means for delivering the solution so made at the bottom of the main receptacle, whereby the densest salt solution may be stored in said salt receptacle at the bottom with lighter salt solution overlying it, means for delivering salt solution of gradually increasing strength from said receptacle, and for storing gradually weaker salt solution in said tank with the stronger towards the bottom and the weaker towards the top.

22. In the regeneration of zeolites used for water softening, the process which comprises first passing into such zeolites a relatively weak salt solution and thereafter passing into such zeolites progressively stronger salt solutions of gradated strengths.

In testimony whereof, I affix my signature.

HEINRICH KRIEGSHEIM.